United States Patent [19]

Scotchmur

[11] 3,738,627

[45] June 12, 1973

[54] CONTROLLER AND CONTROL SYSTEM
[75] Inventor: Ronald R. Scotchmur, Schiller Park, Ill.
[73] Assignee: Binks Manufacturing Company, Franklin Park, Ill.
[22] Filed: Mar. 22, 1971
[21] Appl. No.: 126,566

[52] U.S. Cl.................. 261/119 R, 55/226, 55/227
[51] Int. Cl................................................ B01f 3/04
[58] Field of Search............................ 55/226, 227; 261/119 R

[56] References Cited
UNITED STATES PATENTS
3,364,660  1/1968  Rebours......................... 261/119 R Primary Examiner—Tim R. Miles
Assistant Examiner—Steven H. Markowitz
Attorney—Gary, Parker, Juettner, Pigott & Cullinan

[57] ABSTRACT

A vacuum responsive controller and control system is disclosed for safely controlling the water level in paint spray booths of the type employing a high velocity air-current to entrain water from a reservoir and thereby aid in removing air-borne paint particles. The controller and system sample and signal the vacuum in the booth as an index of the dynamic conditions of water level and air velocity, and for vacuums below a threshold value, automatically raise the reservoir water level to achieve proper entrainment. The controller automatically responds to a lower vacuum to not supply water. Thus a failure of the air impeller will not result in water flowing to the reservoir. The controller includes a diaphragm moving in response to the pressure difference between vacuum and atmospheric inlets and valve means responsive to the diaphragm's flexing over a range to not feed, feed, and again not feed an air pressure signal to a command signal output which controls a water supply valve. Adjustable mechanical biasing on the diaphragm allows for changing the operation point of the controller.

4 Claims, 6 Drawing Figures

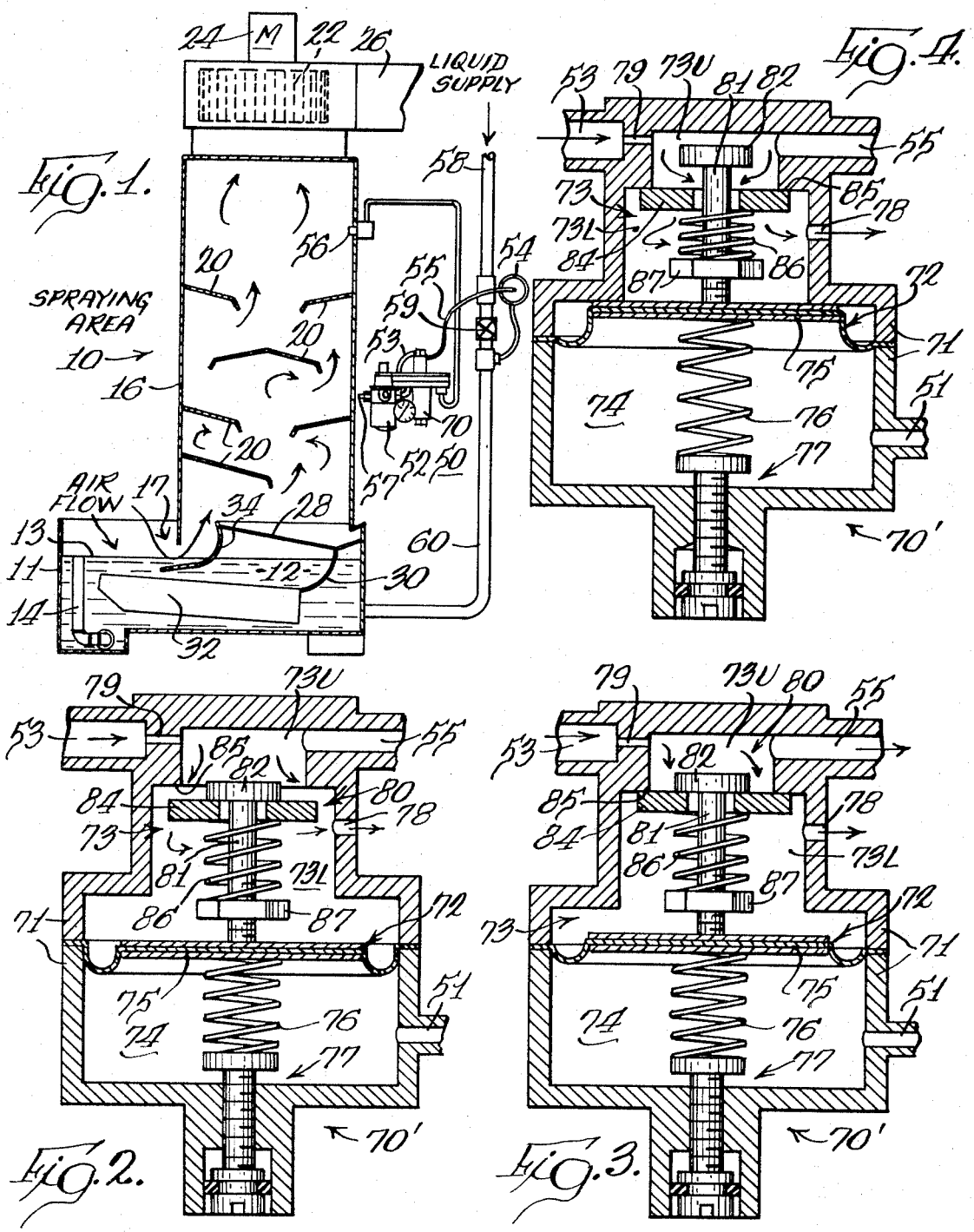

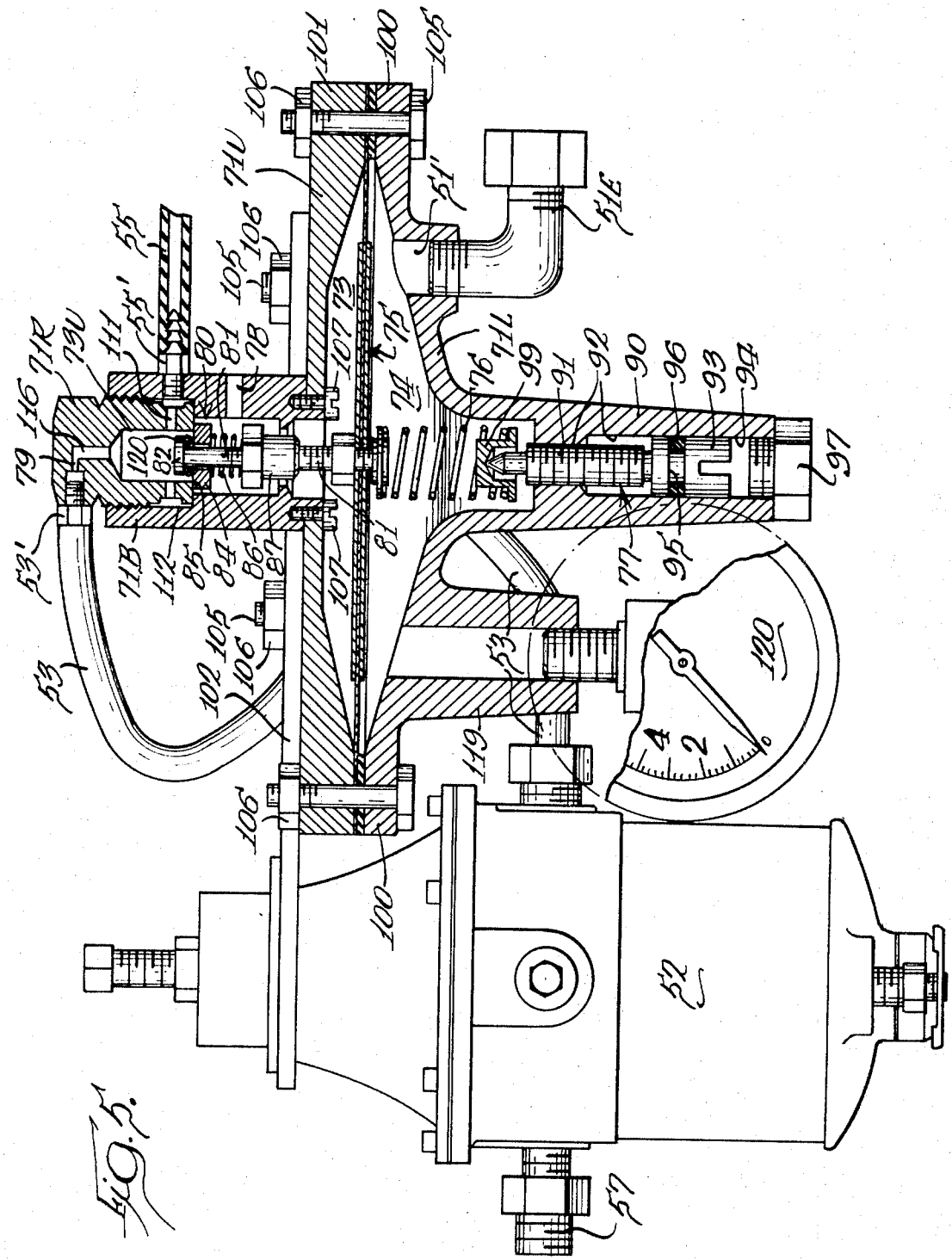

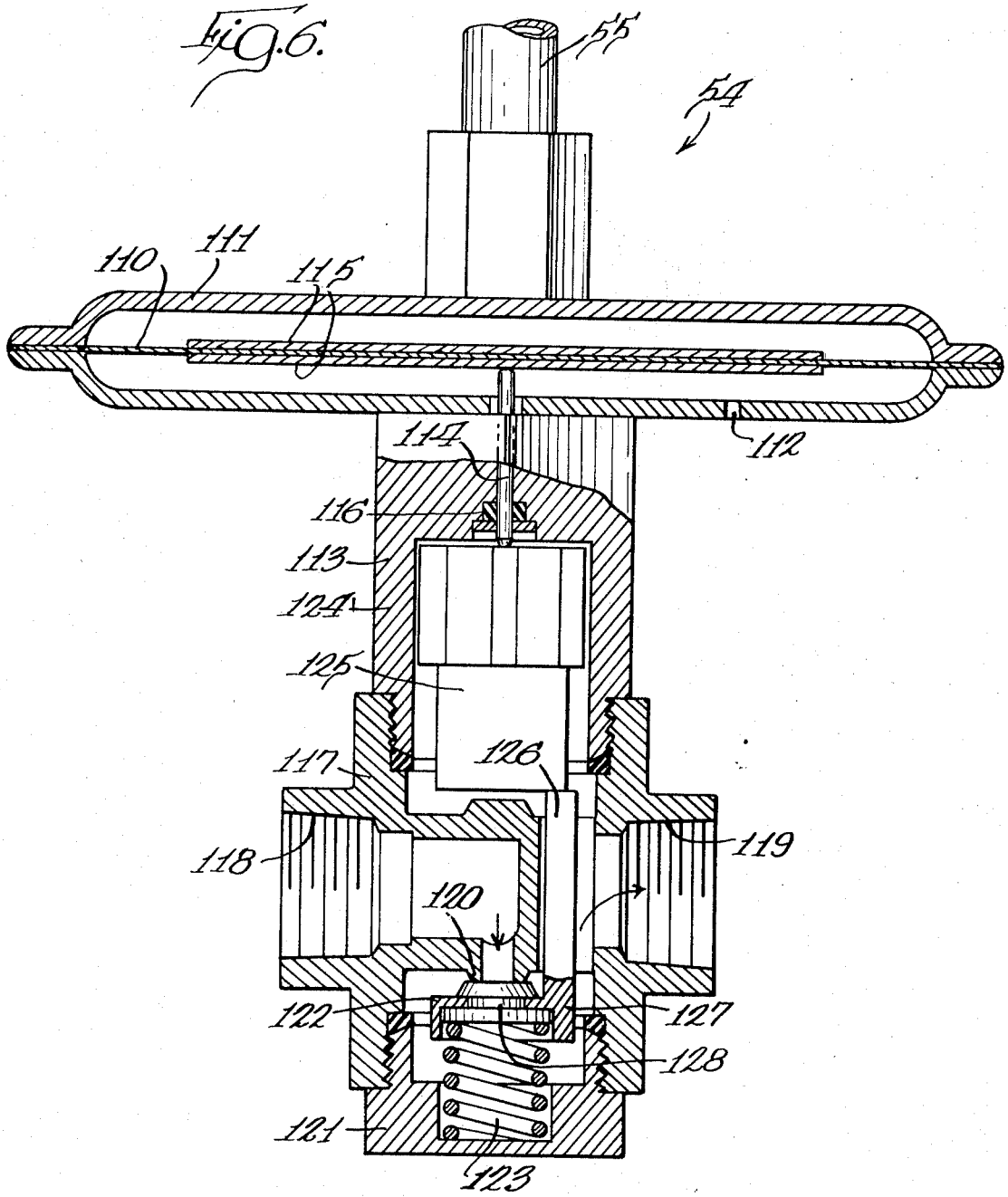

CONTROLLER AND CONTROL SYSTEM

FIELD OF THE INVENTION

The present invention is a new and improved controller and control system and is especially concerned with such a controller and system for safely regulating the water level in paint spray booths of the type wherein a high velocity air-current entrains liquid.

BACKGROUND OF THE INVENTION

One type of paint spray booth employs liquid, normally water, entrained by an air current to aid in the removal of paint particles from the air. This type of paint spray booth eliminates the need for water pumps and spray nozzles and provides for relative economy and simplicity of construction and operation. Consequently such booths have proved popular and have met with significant commercial success.

One such paint spray booth is the presently commercially available "No Pump Spray Booth" manufactured by Binks Manufacturing Company of Chicago, Ill., the assignee of the present invention.

Such booths remove paint particles by drawing air, by means of an impeller, from the spraying area into a scrubbing or washing chamber. This air is drawn along a path which travels over the surface of water held in a reservoir. The air path and water reservoir are so arranged that for certain rates of flow and water levels, the water is entrained by the air and borne into the washing chamber where, by centrifugal action, the water together with the greater part of the air-borne paint particles, are precipitated out to return to the reservoir. In the reservoir, the heavier paint particles settle to the bottom much as silt in a backwater of a stream. With the addition of chemical additives to the water the lighter paint particles may also be broken down and caused to settle in the bottom of the reservoir. Periodically, when a sufficient deposit has developed the reservoir is drained and the deposits removed.

A proper water level and air flow rate to cause and maintain entrainment of water and establish an efficient scrubbing or washing action is critical to the successful operation of this type of spray booth. It is an improvement in the control system and the water level controller that the present invention is directed.

Prior control systems employed an air pressure or relative vacuum sampling device within the washing chamber to detect air flow and in response to vacuums below a certain level to cause additional water to flow from an outside source into the reservoir, thus raising its level. These control systems generally involved a diaphragm for sensing the degree of vacuum, a double acting valve operated by the diaphragm for controlling a relatively high pressure air line, and an air operated valve for controlling the addition of water to the reservoir; the double valve opening the air line over a predetermined range of vacuum pressures sensed by the diaphragm to cause the water valve to open and closing at pressures above and below said range whereby to discontinue the flow of water when the reservoir was filled to the proper level and also when the spray booth was shut down or the air flow therethrough discontinued.

These controls have suffered several disadvantages consequent upon the inherent smallness of the high pressure air valve, the necessity for the same valve to be double acting and the high pressure air system in general.

SUMMARY OF THE INVENTION

To overcome the drawbacks of prior controllers and control systems and to provide for a simpler and more easily manufactured and operated controller, the present invention provides an improvement in such a system including a diaphragm operated interface valve for controlling the water supply at very low air pressure and at the same time isolating the water and air systems, and an improved valve structure operable in response to the vacuum pressure in the washing chamber for controlling the supply of air at very low pressure to said interface valve, and thus controlling the supply of liquid to the reservoir; the improved control valve being highly sensitive to the vacuum signal to cause liquid to be added to the reservoir for vacuums in the range of an intermediate valve value but not for vacuums above or below that value.

BRIEF DESCRIPTION OF THE DRAWINGS

The invention, together with the further advantages thereof, may best be understood by reference to the following description taken in connection with the accompanying drawings, in the several figures of which like reference numerals identify like elements, and in which:

FIG. 1 is a side elevational view, partly in section, of the paint spray booth including a controller and control system constructed in accordance with the principles of the present invention;

FIGS. 2-4 are simplified sectional views of the controller of FIG. 1 illustrating the operation and interrelationship of its various important parts under different operating conditions; and FIG. 5 is an enlarged side view, largely in section, of the controller and its associated parts; and FIG. 6 is an enlarged vertical section of the interface valve used in combination with said controller.

DETAILED DESCRIPTION

Referring to FIG. 1 there is depicted a spray booth generally designated 10. The booth 10 includes a base 11 which defines a liquid reservoir 12. As water is conventionally used to fill the reservoir we will here refer to the liquid as water. It should be understood that other liquids may be employed. The reservoir 12 has a nominal or normal water level 13 and includes a stand pipe 14 extending to that level to drain overflow water from the receiver 12.

Over the back portion of the base 11 and reservoir 12 is a vertical washing chamber 15 having a front wall 16 which extends to just above the level 13. The front wall 16 and liquid level define a slit opening 17 which extends for the width of the chamber 15. Through this slit 17 air is drawn into the chamber 15 during operation of the booth. The bottom edge of the wall 16 is preferably serrated to aid in entraining of water.

The chamber 15 has a number of baffles 20 positioned so as to cause the flowing air and entrained water to be subjected to rapid changes of direction before it reaches the top of the chamber 15. At the upper part of the chamber is an air impeller 22 which may be a blower or fan. The impeller 22 is driven by an electric motor 24 and exhausts air from the chamber 15 and expels it through a duct 26.

At the bottom of the chamber 15 is a collection pan 28 which extends the width of the chamber and collects water and precipitate from the baffles 20, back wall, and the rearward portion of the side walls of the chamber. This collected matter is returned via a conduit 30 to a trough 32 in the reservoir 12 below the level 13. The trough 32 is an inverted channel which serves to aid in recirculating the water and lighter particles while allowing heavier precipitated particles to settle to the bottom of the reservoir.

To aid in entraining of water, a curved distribution plate 34 is provided that extends the width of the reservoir 12. The plate 34 has its approximately horizontal forward edge and forward portion under the level 13 and below the serrated bottom edge of the wall 16 while its rearward approximately vertical portion is affixed to the front edge of the collection pan 28.

The booth 10, as thus far described is known in the art and generally corresponds to the commercially available "NPB" series of booths manufactured by the Binks Manufacturing Company of Chicago, Ill. and described, for example, in their Bulletin No. A27-20R.

In overall operation of the booth 10, air is drawn from the paint spraying area in front of the wall 16 (which area is usually covered by a hood extending outward from the sides and top of the booth 10) through the opening slit 17 into the chamber 15, and thence by and about the baffles 20 and out through the impeller 22 and duct 26. In the process water is entrained by the high velocity air at the opening 17. This air-borne water strikes the various baffles 20 which cause a series of rapid changes of direction. These rapid changes of direction separate the water and air mixture due to centrifugal action. The water and paint particles are thus precipitated to the collection pan 28 and to the reservoir 12. The precipitated paint is collected in the reservoir for eventual removal.

As mentioned before, the size of the slit opening 17 is critical for proper entrainment and operation of the booth 10. Obviously during operation, some water is air-borne and flowing in the chamber and collection pan. Thus the reservoir water level will drop as the booth is initially put into operation. Also during operation water is lost through evaporation into the exhausted air. The rate of such loss will vary from time to time depending upon the air flow rate and the amount of water entrained and the relative humidity of the air drawn from the spraying area. Thus the water level will not of itself remain constant and must be controlled and additional water must be added to make up for lost water.

It is in accordance with the present invention that the booth 10 is equipped with an improved liquid level control system, generally designated 50. This system 50 includes means 56 for sampling the vacuum in the washing chamber 15, a new and improved controller 70, coupled thereto by a vacuum line 51, and means for supplying liquid to the reservoir. This liquid supply means includes an interface valve 54 which is connected to a liquid source 58 and to a reservoir liquid supply line 60, and which is coupled to the controller for control thereby over a control signal air line 55.

The signal transmitted to the controller 70 via the line 51 is the vacuum level present at the sampling means 56. The means 56 is preferably a fixture mounted through the backwall and into the upper part of the chamber 15. This vacuum signal is related to air flow, which flow is dependent upon the size of the opening 17 and thus on the actual water level in the reservoir 12. A constant air pressure source 52, such as a conventional regulator-filter, is connected to the controller 70 and coupled via a line 57 to an air pressure source such as the air line normally available in a paint spraying shop.

The interface valve 54 operates on a low pressure air signal from line 55 and controls passage of water from the supply pipe 58 to the reservoir filling hose 61. Also, as will be later described, the valve isolates the air and control systems from the water system. The valve 54 bypasses a fill valve 59, which is used to initially fill the reservoir 12 and is thereafter kept closed during operation of the system.

The general principles of operation, although not the detailed construction, of the controller 70 can be best understood by reference to FIGS. 2-4, where the simplified controller constructed in accordance with principles of the invention is generally designated 70'.

Referring to those figures it can be seen that the controller 70' includes a two-part housing 71 and a flexible diaphragm 72 clamped between the housing parts 71 and dividing the housing into an upper zone 73 and lower zone 74. The diaphragm 72 preferably comprises a thin flexible membrane and a pair of disc supports 75 which sandwich the central part of the membrane therebetween. The lower disc 75 serves to receive one end of a spring 76 which biases the diaphragm toward the upper zone 73. The bottom of the spring 76 is seated in a screw adjustment 77. The adjustment 77 constitutes means for adjusting the operation point of the controller 70'.

The lower zone 74 is in communication with the vacuum signal line 51 through an inlet 51' while the lower portion 73L of the upper zone 73 communicates via a port 78 to atmosphere. The port 78 and inlet 51' serve as a pair of fluid pressure inlets. Thus for a setting of the screw adjustment 77 the position of the diaphragm is governed by the relative pressure between the inlets 51', 78.

The upper portion 73U of the upper zone 73 is in communication via an air flow restriction 79, such as a small opening, to the regulated low pressure input 53, and via an outlet 55' to the interface valve line 55. Two pressure paths are defined by the housing from the opening 79, one to the command signal outlet 55' and the other to zone 73L, which because of its opening 78 serves as a air pressure vent.

Valve means 80 is positioned in the zone 73 for governing the transfer of a pressure signal from the orifice 79 to the interface control valve line 55 in response to the position of the diaphragm 72. The valve means 80 serves to shut or open the second air pressure path to the vent zone 73L. The valve means 80 includes a valve stem 81 connected with the upper diaphragm disc 75 to travel with the diaphragm 72 and having a first disc shaped valve member 82 affixed to the top of the stem 81.

The valve member 82, sits against a second valve member 84, as shown in FIGS. 2 and 3. The member 84 is generally of washer shape and loosely mounted about the stem 81 below the disc member 82. The valve member 84 has a planar upper surface and is biased toward the disc member 83 by a spring 86. The spring 86 is preferably seated against a base 87 resting on the stem 81. the second valve member 84 is so arranged as to be able to be seated against a flange 85 of the housing 71, as in the position shown in FIGS. 3 and 4.

In overall operation, the controller 70' functions to operate the interface valve by sending a signal over the line 55 for a communicated vacuum signal via the line 51. The operating point of the controller 70' is adjusted so that this threshold vacuum signal represents too low of a water level and improper entrainment of water by the booth. The controller 70' functions to not communicate such an air pressure control signal over line 51 in response to a proper vacuum or, in accordance with one feature of the invention, in response to the substantial lack of any vacuum.

The normal operating state, with sufficiently high water level is depicted in FIG. 2. Because of the relatively high vacuum communicated via line 51 the diaphragm 72 is held down. This has moved down the valve stem 81 and the two valve members 82, 84 to thus keep the valve member 84 away from its valve seat. Under these conditions air from the constant pressure source 53 is bled off out of the chamber 73U through the valve opening to the area 73L and thus to the atmosphere via the opening 78. This air flow is indicated by the arrows in FIG. 2.

The valve opening and the vent 78 are larger than the orifice 79 and thus insure that the line 55 will be at approximately atmosphereic pressure under the conditions of FIG. 2.

When the water level drops in the reservoir, the vacuum communicated by line 51 decreases (the air pressure rises in the wash chamber). The spring 76 thereupon urges the diaphragm upward which causes the stem 81 and its two valve members 82 and 84 to rise. For a sufficiently small drop in vacuum, these members rise enough to seat the valve member 84 and to close off the air path to the zone 73 and the atmosphere. This state is depicted in FIG. 3.

The pressure in the zone 73U rises as air flows through the opening 79 and results in a rise in pressure in line 55 to operate the interface valve 54, and supply more water to the reservoir 12.

When, in normal operation, the water level raises again to the proper level, the vacuum in the chamber 15 increases. This increase in vacuum is communicated over the line 51 and causes diaphragm 72 and the valve member 84 to be pulled downward reopening the passageway to the zone 73L and opening 78 to atmospheric pressure.

This drops the pressure in the zone 73U which pressure drop (via outlet 55' and line 55) is communicated to the interface valve 54 to shutoff the flow of water to the reservoir.

If, however, some abnormal operating conditions should occur, such as an interruption of electrical power to the impeller motor 24, the fall in vacuum in the washing chamber 15 would be drastic and the controller would assume the configuration of FIG. 4. That is, the lack of vacuum would allow the spring 76 to drive the diaphragm 72 and valve stem 81 including the valve member 82 upward. The spring 86, which is of a lower spring constant than the spring 76, would initially maintain the washer shaped valve member 84 seated against the bottom of the member 82. However, as the member 84 reached the lip 85 it would stop its upward movement and as the diaphragm 72 continued to rise, the members 82 and 84 would move apart reopening a bleed path from the zone 73U to the zone 73L and out the opening 78. This would again prevent the rise of pressure in the zone 73U and prevent the activation of the interface valve 54.

Having described the general principle of operation of the controller 70, by means of the simplified controller 70' depicted in FIGS. 2-4, we can now return to consider the preferred construction thereof.

Referring now to FIG. 5 there is depicted the controller 70 of FIG. 1, together with an air filter and pressure regulator 52 and interconnecting couplings. A shop air pressure line of, for example, 20-200 psig is connected to the input 57 of the regulator 52. The regulator 52 serves to produce a regulated low pressure output at, for example, 0.7 to 1.0 psig. This output is coupled, via the line 53, to an input coupling 53' to housing 71 of the controller 70.

The housing 71 of the controller 70 is formed of four major components: a lower casing 71L, an upper casing 71U, a projecting body 71B and retainer 71R mounted therein. The lower casing 71L is shaped generally like a wide wine glass with a central depending stem 90 and with horizontal extending flanges 100. The upper casing 71U is shaped like a shallow dish which covers the lower casing 71L and has a flange 101 sized to conform to the flange 100 thereof. A gasket and the circular margin portion of the diaphragm 72 is sandwiched between the two flanges 100, 101 and the casing 71L, 71U fastened together and to a mounting bracket 102 by means of a plurality of bolts 105 and nuts 106.

The body 71B which is generally of a hollow cylinder shape is affixed by means of machine screws 107 to the casing 71U in a sealed relation thereto. The body 71B is affixed about a central opening in the casing 71U. The retainer 71R is a solid cylinder having a central large bore forming the zone 73U and is threadably mounted into the top of the body 71B. A plurality of horizontal openings 111 communicate air pressure to an annular zone 112 formed about the retainer 71R between it and the body 71B and from which a fixture 55' allows the command signal to be fed to the line 55. The constant air pressure of line 53 is coupled through a connector 53' to the orifice 79 and then to the zone 73U by means of a small bore 116.

The lower casing 70L includes a threaded inlet 51' into which an elbow fixture 51E is fitted and to which the line 51 is coupled. An additional opening from the chamber 74 is provided via a depending wall extension 119 which threadably receives a vacuum gauge 120.

The gauge 120 gives a visual reading of the vacuum in the washing chamber 15 and aids in the set-up, calibration and supervision of the control system 50 and controller 70.

The adjustment 77 consists of a screw 91 threadably mounted at 92 within the stem 90 and having a slotted head 93 which is sized to closely fit within a bore 94 extending upward from the bottom of the stem 90. The head 93 has an encircling groove 95 in which an O-ring seal 96 is mounted. The seal 96 insures that the chamber 74 remains vacuum-tight despite the externally adjustable screw 91. A plug 97 is threadably mounted into the bore 94 at the bottom of the stem 90, as further protection. The point of the screw 91 sits into a button 99 which receives the spring 76.

The diaphragm 72 is similar to that of the diaphragm 72 of FIGS. 2-4 except that its flexible marginal portion was exaggerated in those figures to make its operation clearer. In fact, the travel of the diaphragm and its range of positions is small. However, it is sufficient to operate the valve means 80 which is generally similar in construction; the main difference being that the bottom of the valve member 84 is formed with a spring receiving hollow and an O-ring seal 120 is provided between the members 82, 84.

The provision of the O-ring 120 serves to insure a good seal and provide for a small range of closed positions about the critical position for closing the valve means 80.

It should be noted that the spring 86 is compressed as the diaphragm 72 flexes upward beyond the position in which the valve member 84 makes contact with the holder surface 85 and that the force of this compression is added to the air pressure force on the upper surface of the diaphragm 75 to tend to close the valve means 80. It should also be noticed that because of the smaller circumference of the disc member 82 that the bleed opening formed by an upward movement thereby is smaller than the corresponding opening formed by a similar increment of movement downward by the member 84. The net result of the resiliency of the O-ring 120, the relative small size of disc member 82 and the added downward force of the spring 86 is to provide a small range of diaphragm positions for which the bleed path is effectively closed rather than just a single position, whereby to provide for adequate supply of water so that the valve is not constantly turning off and on.

When the valve members 82 and 84 are closed, air is supplied at very low pressure, e.g., 1 psig. or less, via the line 55 to the interface valve 54. As shown in FIG. 6, this air is supplied to the upper side of a large diameter diaphragm 110 which is sealingly clamped between the two halves of a shell or housing 111. The upper half of the housing together with the air inlet 55 and the diaphragm 110 constitutes a sealed chamber, whereby the air system of the controller is isolated from the water system. The lower half of the housing is suitably provided with one or more breather ports 112, whereby to maintain the lower side of the diaphragm at atmospheric pressure, and also to accommodate drainage of water therefrom should a leak develop in the valve stem seal 116, which is about to be described.

The housing 111 is attached centrally of the bottom wall thereof to the upper end of a valve body 113, and a valve stem 114 extends slidably upward through the body into the housing 111 for engagement with and actuation by the lower one of the diaphragm reinforcing or supporting discs 115. A seal assembly 116 is provided within the body 113 about the stem 114, but even if this seal should develop a leak the air control system is still protected from the water system by the diaphragm 110.

The valve body 113 is of three part construction including a central fluid section 117 provided with a water inlet 118, a water outlet 119 and an intervening valve port and seat 120 which are preferably coaxial with the valve stem; a lower valve section 121 housing a valve 122 and a valve spring 123 which normally biases the valve to closed position on the seat 120; and an upper actuator section 124 housing a valve actuator 125 which engages the valve stem 114 for actuation thereby and which is coupled to the valve 122 by an intervening pin 126 that parallels but is offset from the valve port. As shown, the valve 122 is preferably comprised of a generally annular holder 127 with which the pin or shaft 126 is integrally formed, and a resilient seating member 128 detachably mounted on the holder.

By virtue of the described structure, including the detachable, preferably screw-threaded, assembly of the body parts, the valve section 121 can easily be removed from the fluid section 117 for repair of the valve and replacement of its sealing member 128. Similarly, easy access is had to the sealing assembly 116 by removal of the upper or actuator section 124. Relative to the latter, it is to be further noted that the small diameter of the valve stem or pin 114 aids in minimizing the possibility of water leakage. Considering the large area of the diaphragm 110, which is preferably in the order of 8 to 10 square inches or more, and my preference to have the valve open in the direction of water flow, only a very low air pressure is required on the diaphragm to operate the valve. At the same time, when either of the controller valves 82 or 84 is opened, the upper side of diaphragm is immediately vented to atmosphere and pressure on the opposite sides thereof equalized, whereby the spring 123 can instantly close the valve 122 and stop the flow of water to the reservoir. Thus, the overall control system is very accurate and highly reliable.

From the above description it should be clear that an improved controller and control system has been described which provides not only for adding of liquid to the reservoir in response to vacuum below a threshold level, but protects against continued supply of water when the air impeller fails. The described system and controller are easy and economical to manufacture, install and operate.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

What is claimed is:

1. In a control system for an air washing booth of the type in which impelled air entrains liquid from a reservoir into a washing chamber and in which the liquid surface level in the reservoir must be controlled within narrow limits for proper entrainment, the improvement comprising:

means for sampling the vacuum in the washing chamber and deriving a signal related thereto;

means for supplying liquid to the reservoir;

an interface valve for controlling said liquid supplying means and including operating means responsive to very low air pressure;

a low pressure air supply for said operating means; and a controller including valve means connected to said air supply and said operating means and having vent means therein for selectively connecting said air supply to said operating means and venting both said air supply and said operating means, said controller being coupled to said sampling means and responsive to the vacuum signal from said means to operate said valve means to connect said air supply to said operating means in response to a signal representative of a vacuum less than a first threshold value, but not for a signal representative of a vacuum less than a second value which is less than the first value, whereby liquid is supplied to the reservoir at vacuums intermediate said first and second values to maintain a given liquid surface level in the reservoir, but not at vacuums above or below said values to prevent overfilling of the reservoir.

2. In a control system as set forth in claim 1, said interface valve comprising a normally closed liquid controlling valve and the operating means thereof comprising an air pressure responsive diaphragm of relatively large area for opening the valve at low air pressures, said diaphragm also isolating the liquid part of the system from the air part of the system.

3. In a control system as set forth in claim 2, said diaphragm being coupled to said liquid controlling valve by a small diameter valve stem, and sealing means for said stem, said sealing means and the small diameter of said stem further aiding in isolating the liquid part of the system from the air part thereof.

4. In a control system as set forth in claim 1, said controller valve means comprising a first valve opened at vacuums greater than said first value and seated at vacuums less than said first value, and a second valve normally seated on said first valve and opened at vacuums less than said second value.

* * * * *